Patented June 18, 1940

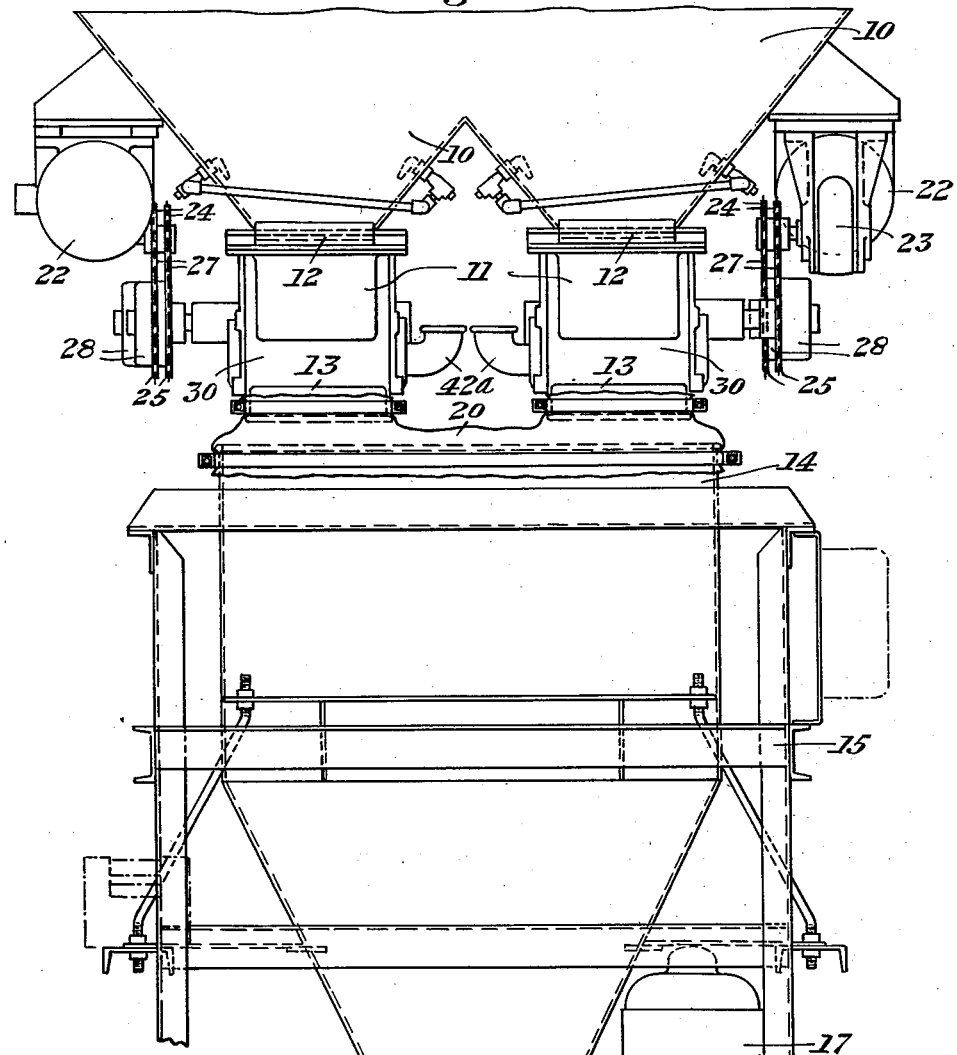
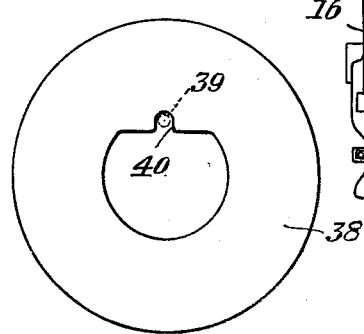
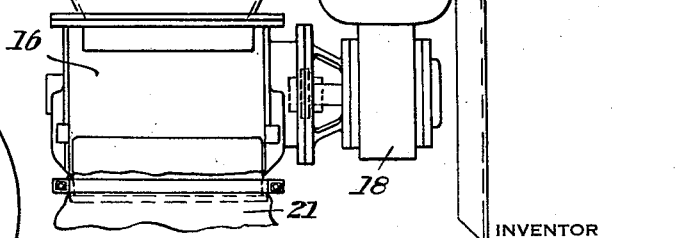

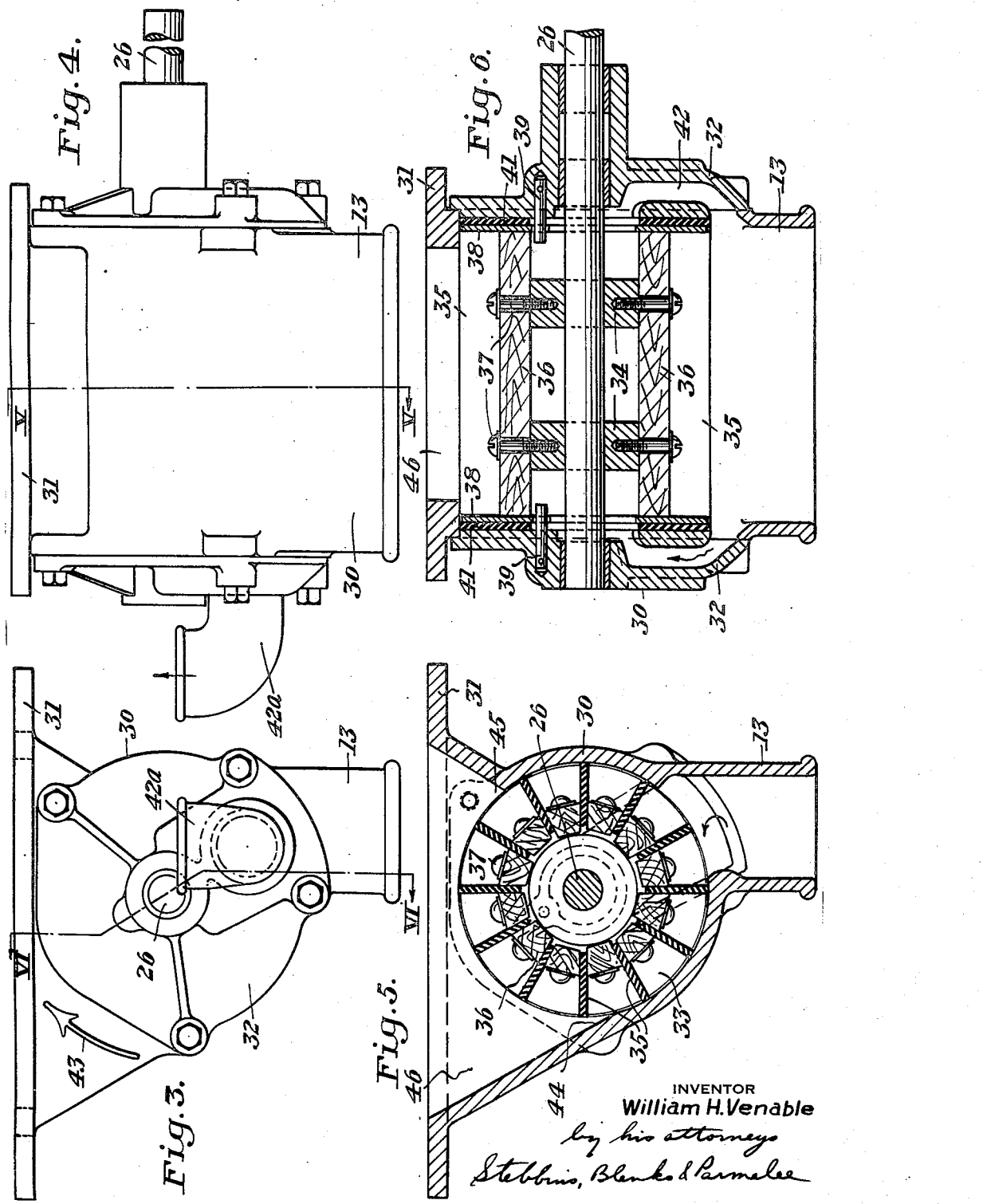

2,205,324

UNITED STATES PATENT OFFICE 2,205,324

MATERIAL-FEEDING APPARATUS AND METHOD

William H. Venable, Pittsburgh, Pa., assignor to Blaw-Knox Company, Pittsburgh, Pa., a corporation of New Jersey Application June 30, 1937, Serial No. 151,092

4 Claims. (Cl. 221—122)

This invention relates to improvements in apparatus of the general character commonly known as rotary feeders or rotary feeder valves.

The object of the invention is to provide for the operation of two feeder valves in succession by means of a single driving mechanism without the use of gear changing mechanism. This possesses special merit in systems where a number of ingredients are measured successively into a single weigh hopper, the feeder being started and stopped by starting and stopping the motor.

A complete understanding of the invention may be gained from the following detailed description thereof which refers to the accompanying drawings illustrating a preferred embodiment. In the drawings, Fig. 1 is a side elevation of the apparatus with parts broken away;

Fig. 2 is an end elevation;

Fig. 3 is a side elevation to enlarged scale of the feeder proper;

Fig. 4 is an end elevation thereof;

Fig. 5 is a sectional view taken along the plane of line V—V of Fig. 4;

Fig. 6 is a sectional view taken along the plane of line VI—VI of Fig. 3; and

Fig. 7 is an elevation of a detail.

Figure 1:
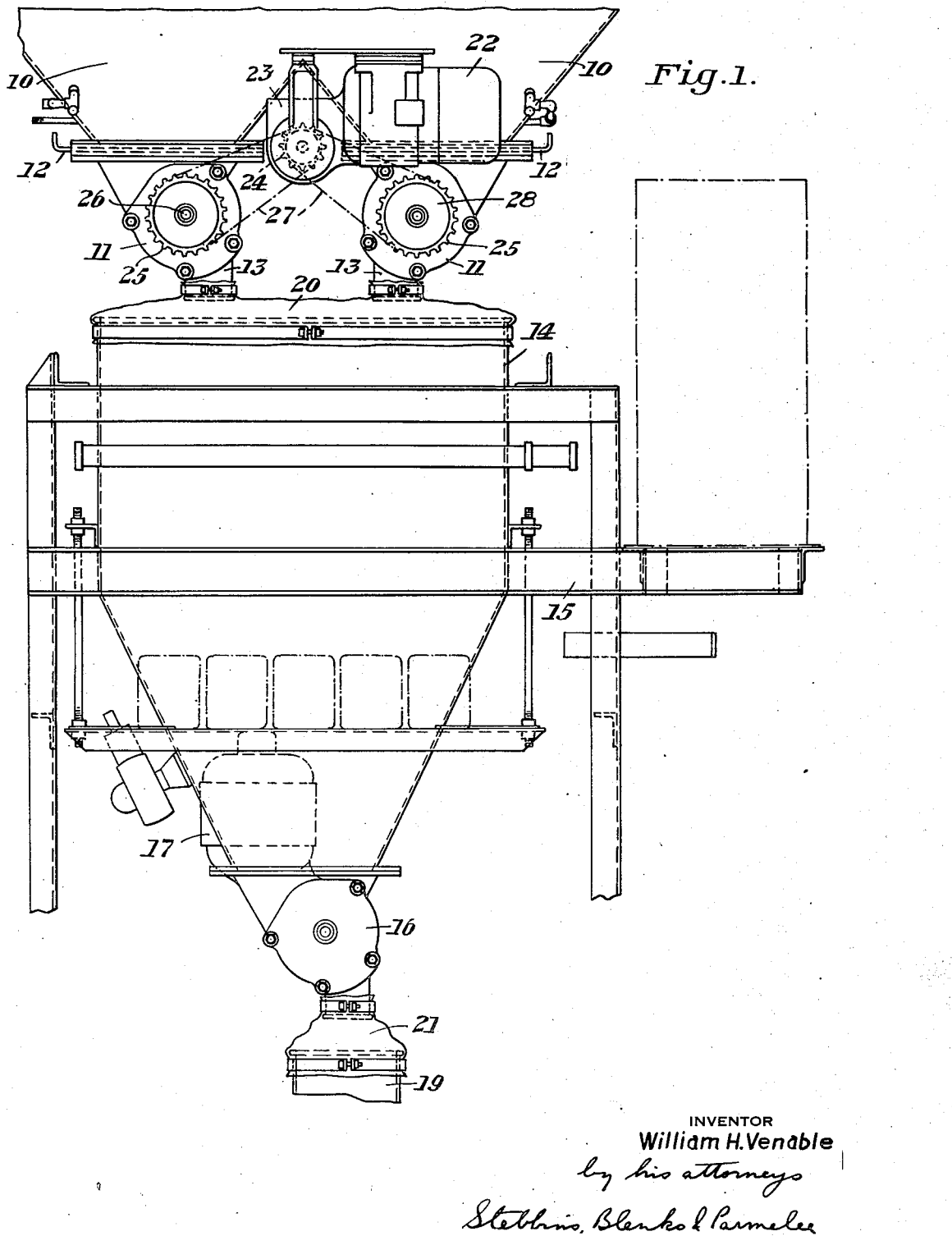

Referring now to the drawings, and for the moment to Figs. 1 and 2, the apparatus of my invention includes discharge outlets 10 depending from storage hoppers or bins there above (not shown). The various classes of materials which it is desired to weigh out for mixing are contained in the bins. At the lower end of each outlet 10 a rotary feeder 11 is positioned. Emergency gates 12 are disposed above the feeders.

As shown in Figs. 1 and 2, there are four feeders 11 disposed at the corners of a rectangle. The construction of these feeders will be described shortly but, for the present, it is sufficient to state that they are effective, when driven, to feed material downwardly from the outlets 10. Each feeder has a neck 13 through which the material fed thereby is discharged into a weigh hopper 14. The weigh hopper is balance-hung in the usual manner, the supporting frame and scale mechanism therefor being indicated diagrammatically at 15. A feeder 16 is located at the lower end of the hopper 14 for discharging the material contained therein when the proper amounts of the several classes of material have been weighed out. The feeder 16 is driven by a motor 17 through suitable gearing 18. In the particular installation illustrated, the material from the weigh hopper 14 is delivered to a screw conveyor, the inlet of which is shown at 19.

The feeders 11 are so disposed that their necks 13 are all offset toward the transverse and longitudinal central planes through the hopper 14. By this arrangement, the size of the hopper 14 can be kept within desired limits without undesirably restricting the capacity of the storage hoppers. A fabric cover, shown at 20, is secured to the necks 13 and the top of the hopper 14 by suitable clamping collars to confine any dust created by the discharge of material into the hopper. A similar cover 21 is attached to the neck of the feeder 16 and inlet 19 of the screw conveyor.

I provide a motor 22 for driving each pair of feeders 11. Reduction gearing 23 associated with each motor includes sprockets 24. Sprockets 25 on shafts 26 of the feeders 11 are driven from the sprockets 24 by chains 27. Each sprocket 25 drives the shaft 26 of its feeder through a unidirectional clutch 28. The clutches 28 are constructed so that one will slip and the other will drive when the motor 22 is energized for rotation in one direction. When the motor is reversed, the clutch which previously was effective to drive its feeder slips idly on the shaft while the clutch which was previously slipping is effective to drive its feeder. One or the other of the two feeders of each pair driven by a single motor may thus be operated at will by controlling the direction of rotation of the driving motor.

The construction of the feeders 11 and 16 is illustrated in detail in Figs. 3 through 7. Each feeder comprises a housing 30 having an attaching flange 31 about its upper edge. The discharge neck 13 is formed integrally with the housing 30. End plates 32 are attached to the housing and provide bearings for the shaft 26 thereof. A feeder rotor 33 is carried on the shaft 26 and comprises spaced hubs 34 to which vanes or paddles 35 are secured by wedge blocks 36. The blocks 36 are anchored to the hubs by screws 37. The vanes 35 are preferably of flexible material, such as rubber, and have wiping engagement with the cylindrical portion of the housing 30. The ends of the vanes 35 abut against wear plates 38. Pins 39 extending inwardly from the end plates 32 enter slots 40 formed in the wear plates and hold them against rotation. Annular gaskets 41 are disposed between the wear plates and the end plates to seal the feeder against leakage therebetween.

Passages 42 formed in the end plates connect the neck 13 with the space surrounding the shaft 20. These passages permit the escape of fine dust from the interior of the hollow rotor. As the rotor revolves, some material may work down from the supply hopper above between the ends of the wedges and vanes (36 and 35) and the surface of the wear plate 38. The amount of this leakage is insignificant expressed as a percentage of the material delivered, but over a long period of operation a sufficient amount could accumulate and be trapped inside the hollow rotor, possibly with injurious effect on the bearings. Passages 42 are provided to drain the interior of the rotor into the discharge neck 13 to prevent such accumulation.

The feeder rotor is driven clockwise, as viewed in Fig. 5. The wall of the housing 30 flares away from the cylinder defined by the outer edges of the vanes 35, at the points 44 and 45. These points are about 150° apart around the feeder, and thus form a relatively wide, gradually tapering mouth 46, which greatly facilitates uniform and substantially complete filling of each of the pockets or spaces between adjacent vanes 35. At point 44 the wall of the housing is nearly tangent to the periphery of the rotor, while at 45 it is nearly perpendicular to the periphery. When the rotation is clockwise, vanes 35 leave the wall at 44 gradually, allowing only a little material to trickle into the rising pocket of the rotor as air escapes into the mouth 46. The pockets are not completely filled until vanes 35 approach the vertical position. The filling region of the rotor is, therefore, about 90° of the 150° angular opening. If the rotation is reversed, vanes rising at 45 leave the wall of the casing abruptly, and the pocket is filled in only a few degrees rotation. This would nullify the advantage of the wide mouth 46. Because of the conformation of the mouth 46, the material starts to fill the pockets substantially as soon as the vane on the forward side passes the point 44. At the same time, air displaced by the material previously fed ascends through the passages 42. Some of this air escapes to the atmosphere through a vent 42a. The remainder is forced upwardly by the vanes 35 into the mouth 46 by the rotation of the feeder rotor. This air is thus forced through the material being fed, with the result that the latter is "fluffed" and maintained in such condition that it will flow downward readily into the pockets. This causes the pockets to be filled uniformly, and avoids irregular feeding of material which has been observed in the operation of rotary feeders as previously constructed.

The feeder is intended to feed when rotated in one direction only. When rotated properly, the up-coming vanes introduce air quite low down on the left hand side as shown in Fig. 5. This keeps the cement fluffed all the way around as the rotor turns. If the rotation is reversed, though air is introduced high up on the right hand side, it escapes upward through the material on that side only and material is not prevented from packing on the left hand side.

It will be apparent from the foregoing description that the invention provides a novel arrangement of material-feeding apparatus wherein a plurality of discharge outlets or necks are brought relatively close together so that the weigh hopper need not be unduly large, even though the centers of the feeders are not correspondingly close together, but are spaced far enough apart to serve storage bins of adequate capacity for different kinds of material. The invention also provides simple means for selectively operating one of a pair of feed rotors by merely reversing the direction of the driving motor. A further advantage of the invention is that the material is maintained in condition for ready flow at all times, by feeding air upwardly therethrough to prevent packing, and assure uniform steady feeding and satisfactory filling of the pockets between rotor vanes.

It is apparent also that certain features of the invention could be used if only one kind of material were to be handled and only one feeder mechanism to fill the weigh hopper were employed. For instance, referring to Fig. 1, connection might be made to operate the discharge valve 16 from the drive mechanism 24 and only one of the feeders 11, omitting the other. In that event, running the motor in one direction would charge the hopper, stopping the motor would stop the charging, and reversing the motor would discharge the hopper. Of course, when such an arrangement is made the connection between 24 and 16 has to be such as not to interfere with the sensitivity of the scales.

Although I have illustrated and described herein but a preferred embodiment and practice of the invention, changes in the construction and procedure disclosed may be made without departing from the spirit of the invention or the scope of the appended claims.

I claim:

1. In mechanism for apportioning materials into a batch, the combination with a common receptacle and a pair of rotary feeders for charging same, of driving means for said feeders including a reversible motor and automatic clutch mechanism whereby the motor, when turning in one direction, operates one feeder continuously and when the motor turns in the other direction, it operates the other feeder continuously.

2. In mechanism for apportioning materials into a batch, the combination with a common receptacle and a pair of rotary feeders for charging same, of driving means for said feeders including a reversible motor and automatic clutch mechanism whereby the motor operates one feeder continuously while the motor turns in one direction and the other feeder continuously while the motor turns in the opposite direction, the feeders having discharge outlets and inlets, the discharge outlets being closer together than the inlets.

3. In mechanism for apportioning materials into a batch, the combination with a common receptacle and a pair of rotary feeders for charging same, of driving means for said feeders including a reversible motor and automatic clutch mechanism whereby one feeder is operated as long as the motor turns in one direction and the other feeder is operated as long as the motor turns in the opposite direction, the direction of rotation for discharge of each feeder being opposite that of the other.

4. The combination with two rotary feeders and a common receiving receptacle therebelow, of driving means therefor including a reversible motor and clutch mechanisms effective to drive in one direction only, said mechanisms being such that so long as the motor rotates in one direction, one feeder will continue to operate, and so long as the motor rotates in the opposite direction the other feeder will continue to operate.

WILLIAM H. VENABLE.